United States Patent
Sano et al.

(10) Patent No.: US 10,676,114 B2
(45) Date of Patent: Jun. 9, 2020

(54) COLLISION ENERGY ABSORBING DEVICE OF RAILCAR

(71) Applicant: KAWASAKI JUKOGYO KABUSHIKI KAISHA, Kobe-shi, Hyogo (JP)

(72) Inventors: Atsushi Sano, Kobe (JP); Naoaki Kawakami, Kobe (JP); Naohiro Yoshida, Kobe (JP); Shinichiro Hata, Kobe (JP); Seiichiro Yagi, Akashi (JP); Masayuki Tomizawa, Akashi (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 228 days.

(21) Appl. No.: 15/580,505

(22) PCT Filed: Jun. 7, 2016

(86) PCT No.: PCT/JP2016/002746
§ 371 (c)(1),
(2) Date: Dec. 7, 2017

(87) PCT Pub. No.: WO2017/022159
PCT Pub. Date: Feb. 9, 2017

(65) Prior Publication Data
US 2018/0162422 A1 Jun. 14, 2018

(30) Foreign Application Priority Data
Aug. 4, 2015 (JP) .................................. 2015-154188

(51) Int. Cl.
*B61F 19/04* (2006.01)
*B61D 15/06* (2006.01)
(Continued)

(52) U.S. Cl.
CPC .............. *B61F 19/04* (2013.01); *B60R 19/26* (2013.01); *B61D 15/06* (2013.01); *B61G 11/16* (2013.01); *F16F 7/12* (2013.01)

(58) Field of Classification Search
CPC .......... B61F 19/00; B61F 19/04; B61D 15/00; B61D 15/06; B61G 11/00; B61G 11/02; B61G 11/04; B61G 11/08; B61G 11/10
See application file for complete search history.

(56) References Cited

U.S. PATENT DOCUMENTS

2010/0126813 A1 5/2010 Hayashi

FOREIGN PATENT DOCUMENTS

JP 2005-162061 A 6/2005
JP 2010-83307 A 4/2010
(Continued)

OTHER PUBLICATIONS

Sep. 6, 2016 Search Report issued in International Patent Application No. PCT/JP2016/002746.
(Continued)

*Primary Examiner* — Robert J McCarry, Jr.
(74) *Attorney, Agent, or Firm* — Oliff PLC

(57) ABSTRACT

A collision energy absorbing device of a railcar includes: at least one outside plate constituting an outer tube having an axis extending in a car longitudinal direction; and at least one partition plate extending in the car longitudinal direction in an internal space surrounded by the at least one outside plate, the at least one partition plate fixed to the at least one outside plate and dividing the internal space. An end portion of the partition plate which portion is located at an end in a direction perpendicular to the axis is sandwiched by the at least one outside plate and constitutes a part of the outer tube.

7 Claims, 6 Drawing Sheets

(51) Int. Cl.
*B61G 11/16* (2006.01)
*F16F 7/12* (2006.01)
*B60R 19/26* (2006.01)

(56) References Cited

FOREIGN PATENT DOCUMENTS

| | | | | |
|---|---|---|---|---|
| JP | 2015-30340 A | | 2/2015 | |
| JP | 201530340 | * | 2/2015 | ............. B61D 15/06 |
| KR | 2010-0022621 A | | 3/2010 | |
| KR | 2010000022621 | * | 3/2010 | ............. B61D 15/06 |
| WO | 2006/036065 A1 | | 4/2006 | |
| WO | WO-2006036065 A1 | * | 4/2006 | ............. B60R 19/34 |

OTHER PUBLICATIONS

Feb. 6, 2018 Preliminary Report on Patentability issued in International Patent Application No. PCT/JP2016/002746.

* cited by examiner

COLLISION ENERGY ABSORBING DEVICE OF RAILCAR

TECHNICAL FIELD

The present invention relates to a collision energy absorbing device of a railcar.

BACKGROUND ART

A railcar may be provided with a collision energy absorbing device for easing an impact generated at the time of collision. To reduce reinforcing members of a carbody from the viewpoint of a reduction in weight of the carbody, a maximum load acting on the carbody needs to be reduced. Therefore, the collision energy absorbing device is required to reduce a peak load, generated at an initial stage of the collision, to reduce the maximum load at the time of the collision. An impact absorbing member disclosed in PTL 1 includes a quadrangular, tubular main body and a cross-shaped rib provided inside the main body along an axial direction of the main body and is produced by extrusion molding. A flat pressure receiving plate is provided at a front end of the impact absorbing member, and a cutout portion is partially formed at a rear end of the impact absorbing member. According to PTL 1, since the strength of the impact absorbing member is partially low in the vicinity of the cutout portion, a load peak value at the initial stage of the collision is reduced.

CITATION LIST

Patent Literature

PTL 1: Japanese Laid-Open Patent Application Publication No. 2005-162061

SUMMARY OF INVENTION

Technical Problem

However, since the impact absorbing member of PTL 1 is produced by extrusion molding, the degree of freedom of the shape of the main body and the degree of freedom of the shape of the rib are limited, and there is a limit to an improvement in impact absorbing performance. If the cross-shaped rib is produced separately from the quadrangular, tubular main body, and the rib is assembled so as to be inserted into the main body, the degrees of freedom of the shapes improve, but work of fixing the rib to the main body is complex. In addition, if a dimension error between the main body and the rib is large, the assembling itself becomes difficult.

An object of the present invention is to provide a collision energy absorbing device having a high degree of freedom of a shape thereof and capable of being produced easily.

Solution to Problem

A collision energy absorbing device of a railcar according to one aspect of the present invention includes: at least one outside plate constituting an outer tube having an axis extending in a car longitudinal direction; and at least one partition plate extending in the car longitudinal direction in an internal space surrounded by the at least one outside plate, the at least one partition plate fixed to the outside plate and dividing the internal space, an end portion of the partition plate which portion is located at an end in a direction perpendicular to the axis being sandwiched by the outside plate, the end portion constituting a part of the outer tube.

According to the above configuration, the end portion of the partition plate which portion is located at the end in the direction perpendicular to the axis is sandwiched by the outside plate, and the end portion of the partition plate is accessible from an outside of the outer tube. Therefore, assembling work, such as work of fixing the partition plate to the outside plate, can be facilitated. Further, the end portion of the partition plate which portion is located at the end in the direction perpendicular to the axis is sandwiched by the outside plate, so that even if a dimension error of the partition plate in the direction perpendicular to the axis occurs, the assembling can be easily performed.

Advantageous Effects of Invention

The present invention can provide the collision energy absorbing device having a high degree of freedom of the shape thereof and capable of being produced easily.

DESCRIPTION OF EMBODIMENTS

Hereinafter, embodiments will be explained in reference to the drawings. In the following embodiments, a direction in which a railcar travels, in other words, a direction in which a carbody extends is referred to as a car longitudinal direction or a forward/rearward direction, and a lateral direction perpendicular to the car longitudinal direction is referred to as a car width direction or a leftward/rightward direction. The railcar can travel in both directions along the car longitudinal direction. However, in the following explanation, for convenience sake, a right direction in FIG. 1 is defined as a forward direction, and a left direction therein is defined as a rearward direction.

Embodiment 1

Figure 1:
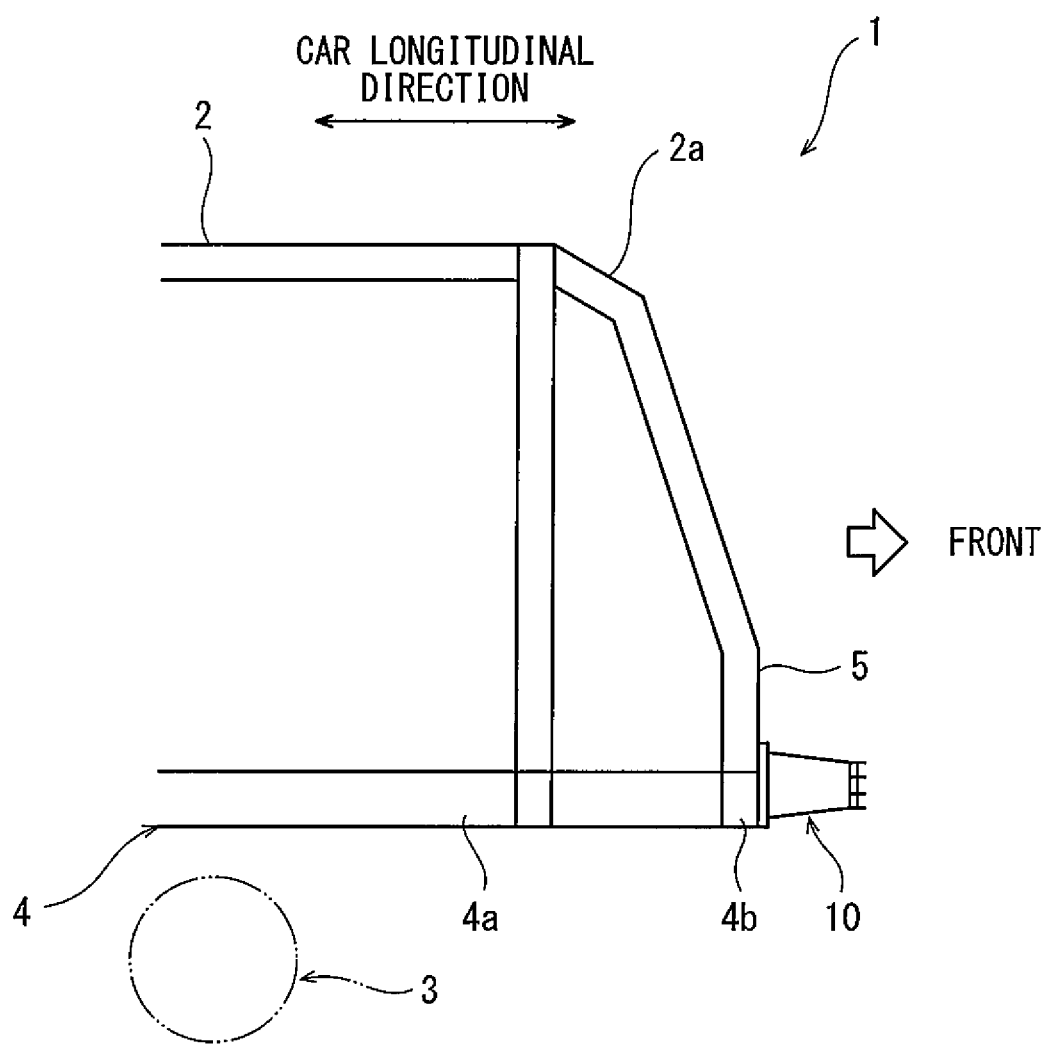
FIG. 1 is a side view of a head portion of a carbody of a railcar according to Embodiment 1.

FIG. 1 is a side view of a head portion 2a of a carbody 2 of a railcar 1 according to Embodiment 1. As shown in FIG. 1, the railcar 1 includes the carbody 2 and a bogie 3 supporting the carbody 2. A collision energy absorbing device 10 is fixed to a front portion of the head portion 2a of the carbody 2 so as to project forward. With this, when railcars traveling on the same railway track collide head-on with each other or when a railcar collides with an obstacle, the collision energy absorbing device 10 crushes by a load from a front side to absorb collision energy.

The carbody 2 includes an underframe 4. The underframe 4 includes a pair of side sills 4a and an end beam 4b. The pair of side sills 4a extend in the car longitudinal direction so as to be spaced apart from each other in the car width direction. The end beam 4b extends in the car width direction to couple front ends of the pair of side sills 4a to each other. A lower end portion of a post 5 extending upward from the end beam 4b is joined to the end beam 4b. The collision energy absorbing device 10 is fixed to a front surface of the end beam 4b and a front surface of the post 5 to project forward from the underframe 4.

Figure 2:
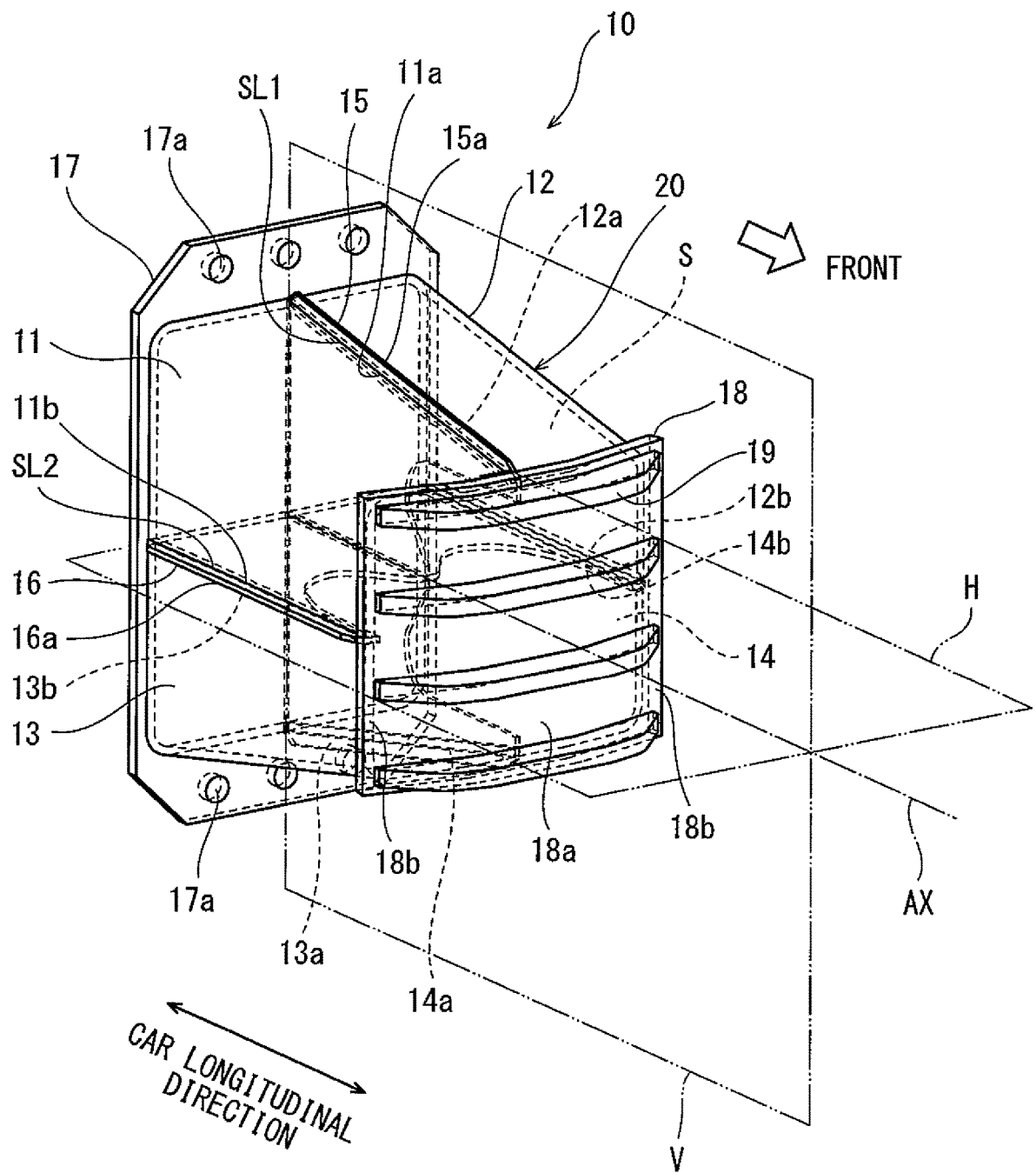
FIG. 2 is a perspective view of a collision energy absorbing device mounted on the carbody of FIG. 1.

FIG. 2 is a perspective view of the collision energy absorbing device 10 mounted on the carbody 2 of FIG. 1. As shown in FIG. 2, the collision energy absorbing device 10 includes a plurality of outside plates 11 to 14, a vertical partition plate 15, a horizontal partition plate 16, a rear plate 17, and a front plate 18. The plates 11 to 18 are made of, for example, metal. The plurality of outside plates 11 to 14 are combined with one another through the vertical partition plate 15 and the horizontal partition plate 16 to constitute an outer tube 20. An axis AX passing through the center of gravity of the outer tube 20 coincides with the car longitudinal direction. The outer tube 20 has an outer shape that is symmetrical with respect to a virtual vertical surface V including the axis AX and also symmetrical with respect to a virtual horizontal surface H including the axis AX. The outer tube 20 has such a tapered shape that a vertical cross section of the outer tube 20 which section includes the axis AX becomes small from a rear side toward the front side. A horizontal cross section of the outer tube 20 which section includes the axis AX has a rectangular shape. Further, a vertical cross section of the outer tube 20 which section is perpendicular to the axis AX has a quadrangular shape.

The plurality of outside plates 11 to 14 are obtained by dividing the outer tube 20 into a plurality of parts along parting lines extending in the car longitudinal direction. In the present embodiment, the number of outside plates 11 to 14 is four. The outside plates 11 to 14 are arranged so as to be symmetrical with respect to the virtual vertical surface V and also symmetrical with respect to the virtual horizontal surface H. In the present embodiment, the outside plates 11 to 14 are the same in shape as one another, and a vertical cross section of each of the outside plates 11 to 14 which section is perpendicular to the axis AX has an L shape. Slots SL1 and SL2 (gaps) are formed between opposing end edges of the outside plates 11 to 14. End portions 15a of the vertical partition plate 15 are inserted into the slots SL1, the end portions 15a being located at both respective ends in a direction perpendicular to the axis AX. With this, the end portions 15a are sandwiched by the outside plates 11 to 14. Similarly, end portions 16a of the horizontal partition plate 16 are inserted into the slots SL2, the end portions 16a being located at both respective ends in a direction perpendicular to the axis AX. With this, the end portions 16a are sandwiched by the outside plates 11 to 14.

The vertical partition plate 15 and the horizontal partition plate 16 extends in a direction along the axis AX in an internal space S surrounded by the outside plates 11 to 14. The vertical partition plate 15 and the horizontal partition plate 16 intersect with each other and fix the outside plates 11 to 14. The vertical partition plate 15 divides the internal space S into left and right parts, and the horizontal partition plate 16 divides the internal space S into upper and lower parts. The upper and lower end portions 15a of the vertical partition plate 15 are located at the upper and lower slots SL1, respectively, the upper and lower slots SL1 being formed by the outside plates 11 to 14. The upper and lower end portions 15a are sandwiched by end edges 11a to 14a of the outside plates 11 to 14 in the leftward/rightward direction. The left and right end portions 16a of the horizontal partition plate 16 are located at the respective slots SL2 formed by the outside plates 11 to 14. The left and right end portions 16a are sandwiched by end edges 11b to 14b of the outside plates 11 to 14 in an upward/downward direction. To be specific, the end portions 15a of the vertical partition plate 15 and the end portions 16a of the horizontal partition plate 16 partially constitute the outer tube 20. The end portions 15a of the vertical partition plate 15 and the end portions 16a of the horizontal partition plate 16 project outward beyond outer surfaces of the outside plates 11 to 14.

The rear plate 17 faces a rear end of the outer tube 20 and is larger than an outer shape of the rear end of the outer tube 20. Fastening holes 17a are formed on a portion of the rear plate 17, the portion being located outside beyond the rear end of the outer tube 20 in a direction perpendicular to the axis AX. To be specific, the collision energy absorbing device 10 is fixed to the carbody 2 by fastening members (such as bolts or rivets) inserted into the fastening holes 17a of the rear plate 17. It should be noted that the rear plate 17 may be fixed to the carbody 2 by welding.

The front plate 18 faces a front end of the outer tube 20 and is larger than an outer shape of the front end of the outer tube 20. The front plate 18 has such a shape that a car width direction middle portion 18a thereof projects forward beyond both car width direction end portions 18b thereof (also see FIG. 4). Specifically, a horizontal cross section of the front plate 18 has a shape that is convex toward the front side. A vertical cross section of the front plate 18 has a shape that extends linearly in the vertical direction. A plurality of plate-shaped anti-climbers 19 are fixed to a front surface of the front plate 18 so as to be spaced apart from one another in the vertical direction and extend in the car width direction.

Figure 3A:
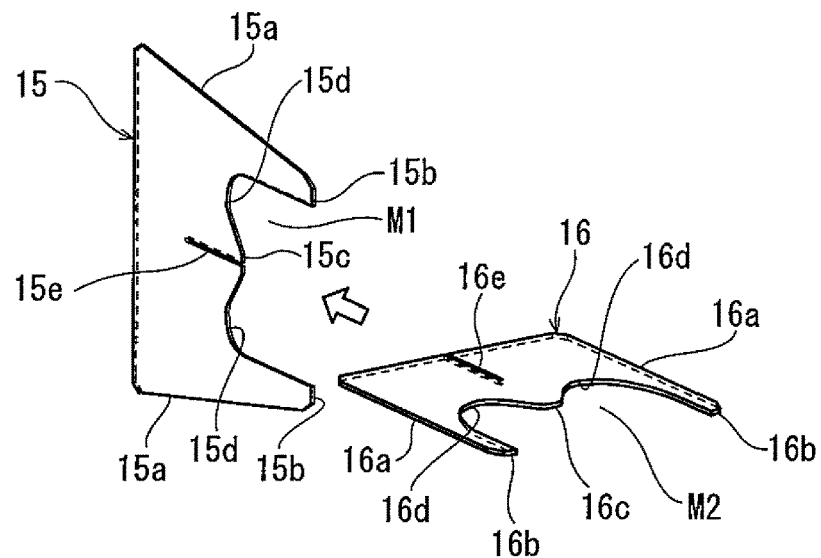
FIGS. 3A to 3C are exploded perspective views of the collision energy absorbing device of FIG. 2.
Figure 3B:
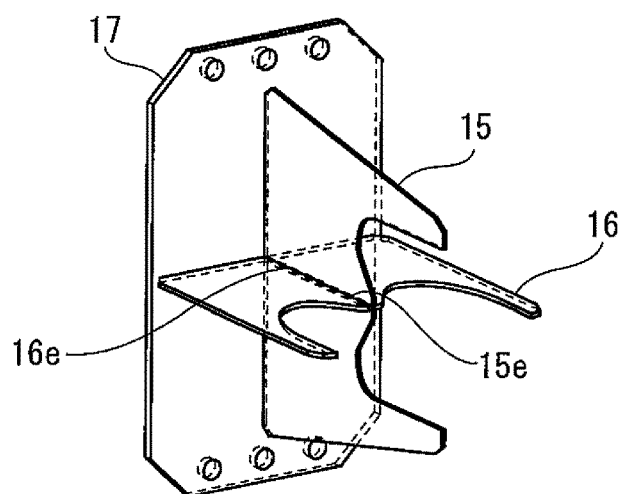
Figure 3C:
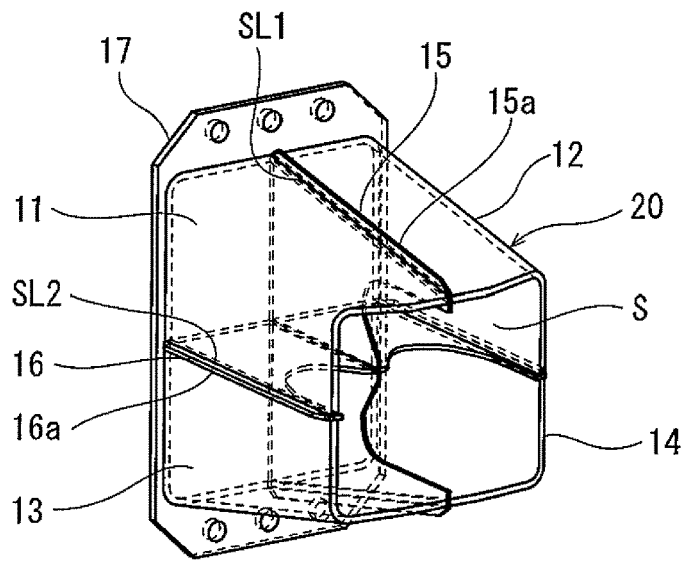

FIGS. 3A to 3C are exploded perspective views of the collision energy absorbing device 10 of FIG. 2. As shown in FIGS. 2 and 3A, the pair of end portions 15a of the vertical partition plate 15 are inclined so as to get close to each other as they extend from the rear side to the front side. The vertical partition plate 15 includes a missing portion M1 in the internal space S surrounded by the outside plates 11 to 14. The missing portion M1 is a cut portion provided at a region of a virtual flat surface including the vertical partition plate 15 so as to decrease an area of the region of the virtual flat surface, the region being defined by a front surface of the rear plate 17, an inner surface of the outer tube 20, and a rear surface of the front plate 18. In the present embodiment, the missing portion M1 is formed by cutting out a front portion of the vertical partition plate 15 such that the front end of the vertical partition plate 15 is depressed rearward.

The missing portion M1 has such a shape that an area of a cross section of the vertical partition plate 15 which section is perpendicular to the axis AX gradually increases as a cutting position of the cross section of the vertical partition plate 15 goes from the front side to the rear side. Specifically, the front end of the vertical partition plate 15 is formed in a W shape. To be specific, the front end portion of the vertical partition plate 15 includes: convex portions 15b located at both respective sides in the vertical direction and projecting forward; a convex portion 15c located at a middle in the vertical direction and projecting forward; and concave portions 15d each located between the convex portion 15b and the convex portion 15c and depressed rearward. A projection amount of the convex portion 15c in the forward direction is smaller than a projection amount of the convex portion 15b in the forward direction. An opposing slit 15e is formed at a vertically middle of the vertical partition plate 15. The opposing slit 15e extends rearward from the front end of the vertical partition plate 15 and terminates at an intermediate position between the front and rear ends of the vertical partition plate 15.

The pair of end portions 16a of the horizontal partition plate 16 are substantially parallel to each other. The horizontal partition plate 16 includes a missing portion M2 in the internal space S surrounded by the outside plates 11 to 14. The missing portion M2 of the horizontal partition plate 16 is substantially the same in shape as the missing portion M1 of the vertical partition plate 15. To be specific, the front end portion of the horizontal partition plate 16 includes: convex portions 16b located at both respective sides in the horizontal direction and projecting forward; a convex portion 16c located at a middle in the horizontal direction and projecting forward; and concave portions 16d each located between the convex portion 16b and the convex portion 16c and depressed rearward. The projection amount of the convex portion 16c in the forward direction is smaller than the projection amount of the convex portion 16b in the forward direction. An opposing slit 16e is formed at a horizontally middle of the horizontal partition plate 16. The opposing slit 16e extends forward from the rear end of the horizontal partition plate 16 and terminates at an intermediate position between the rear and front ends of the horizontal partition plate 16.

Next, an assembling procedure of the collision energy absorbing device 10 will be explained. As shown in FIGS. 3A and 3B, the opposing slit 15e of the vertical partition plate 15 and the opposing slit 16e of the horizontal partition plate 16 are fitted to each other, and the vertical partition plate 15 and the horizontal partition plate 16 are positioned so as to intersect with each other. In this state, portions of the vertical and horizontal partition plates 15 and 16 which portions contact each other are joined to each other by welding, and the vertical partition plate 15 and the horizontal partition plate 16 are joined to the rear plate 17 by welding.

Next, the outside plates 11 to 14 are arranged so as to constitute the outer tube 20. The upper and lower end portions 15a of the vertical partition plate 15 are sandwiched by the outside plates 11 to 14 in the leftward/rightward direction, and the left and right end portions 16a of the horizontal partition plate 16 are sandwiched by the outside plates 11 to 14 in the upward/downward direction. At this time, the end portions 15a and 16a of the vertical and horizontal partition plates 15 and 16 project outward beyond the outer surfaces of the outside plates 11 to 14. In this state, the end portions 15a and 16a of the vertical and horizontal partition plates 15 and 16 and the outside plates 11 to 14 are joined to one another by welding from outside. Further, the outside plates 11 to 14 are joined to the rear plate 17 by welding. Next, as shown in FIG. 2, the outside plates 11 to 14 are joined to the front plate 18 by welding.

Figure 4:
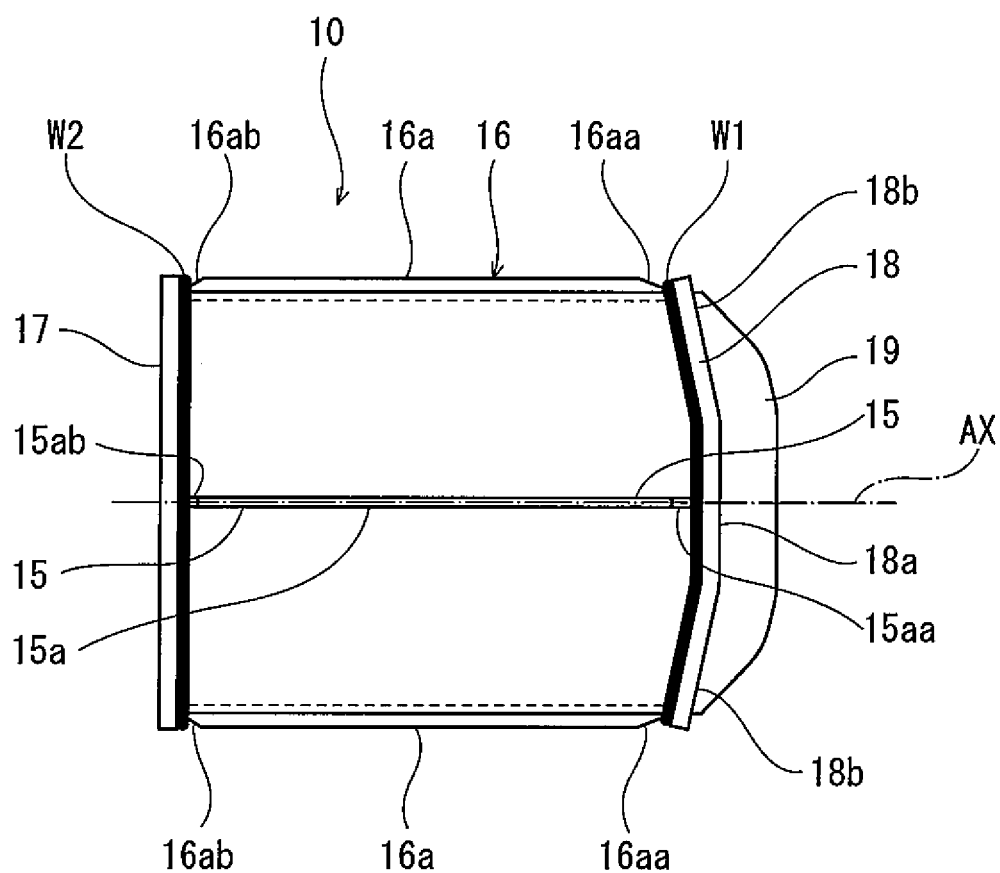
FIG. 4 is a plan view of the collision energy absorbing device of FIG. 2.

FIG. 4 is a plan view of the collision energy absorbing device 10 of FIG. 2. As shown in FIG. 4, front ends of the end portions 15a and 16a of the vertical and horizontal partition plates 15 and 16 contact the front plate 18 from behind, and the projection amounts of front end regions 15aa and 16aa of the end portions 15a and 16a from the outer surfaces of the outside plates 11 to 14 decrease as the front end regions 15aa and 16aa extend forward. With this, when joining the front end portion of the outer tube 20 to the front plate 18 by welding W1 from outside, the end portions 15a and 16a of the vertical and horizontal partition plates 15 and 16 do not interfere with the welding. Further, rear ends of the end portions 15a and 16a of the vertical and horizontal partition plates 15 and 16 contact the rear plate 17 from front, and the projection amounts of rear end regions 15ab and 16ab of the end portions 15a and 16a from the outer surfaces of the outside plates 11 to 14 decrease as the rear end regions 15ab and 16ab extend rearward. With this, when joining the rear end portion of the outer tube 20 to the rear plate 17 by welding W2 from outside, the end portions 15a and 16a of the vertical and horizontal partition plates 15 and 16 do not interfere with the welding.

According to the configuration explained above, since the end portions 15a and 16a of the vertical and horizontal partition plates 15 and 16 which portions are located at both ends in the direction perpendicular to the axis AX are inserted into the slots SL1 and SL2 and sandwiched by the outside plates 11 to 14, the end portions 15a and 16a of the vertical and horizontal partition plates 15 and 16 are accessible from an outside of the outer tube 20. With this, assembling work of the collision energy absorbing device 10 is facilitated. Further, the end portions 15a and 16a of the partition plates 15 and 16 are inserted into the slots SL1 and SL2 and sandwiched by the outside plates 11 to 14, so that even if a dimension error between the partition plates 15 and 16 in the direction perpendicular to the axis AX occurs, the assembling can be easily performed.

Since the slots SL1 and SL2 are formed by the end edges 11a to 14a and 11b to 14b of the outside plates 11 to 14, and the end portions 15a and 16a of the partition plates 15 and 16 are sandwiched by the end edges 11a to 14a and 11b to 14b of the outside plates 11 to 14, the positioning of the outside plates 11 to 14 is facilitated, and the degree of freedom of the assembling is improved. Further, since the end portions 15a and 16a of the partition plates 15 and 16 project outward beyond the outer surfaces of the outside plates 11 to 14, and the end portions 15a and 16a of the partition plates 15 and 16 and the outer surfaces of the outside plates 11 to 14 are joined to one another by welding, the partition plates 15 and 16 and the outside plates 11 to 14 can be easily fixed to one another.

Since the vertical partition plate 15 and the horizontal partition plate 16 are joined to each other by welding with the opposing slits 15e and 16e fitted to each other, the vertical partition plate 15 and the horizontal partition plate 16 can be accurately welded to each other. Further, since the vertical partition plate 15 and the horizontal partition plate 16 are stably positioned with the opposing slits 15e and 16e fitted to each other, the amount of welding can be reduced. With this, thermal distortion by the welding can be reduced, and cracks from a weld line can be suppressed.

Embodiment 2

Figure 5:
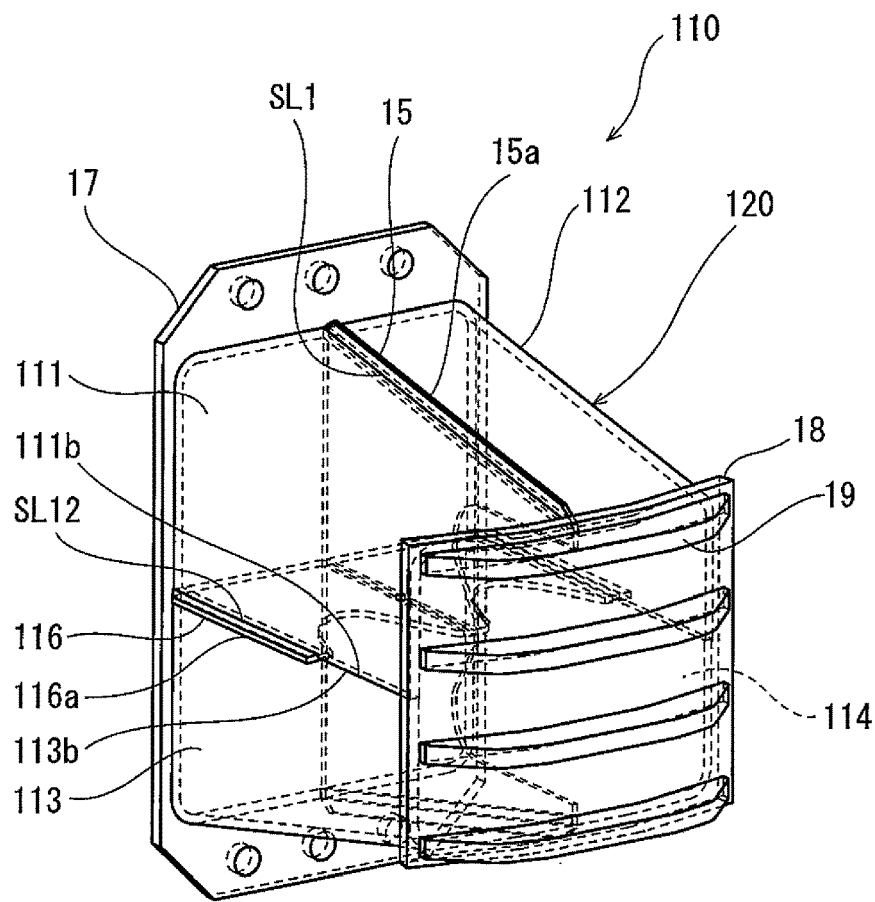
FIG. 5 is a perspective view of the collision energy absorbing device according to Embodiment 2.
Figure 6:
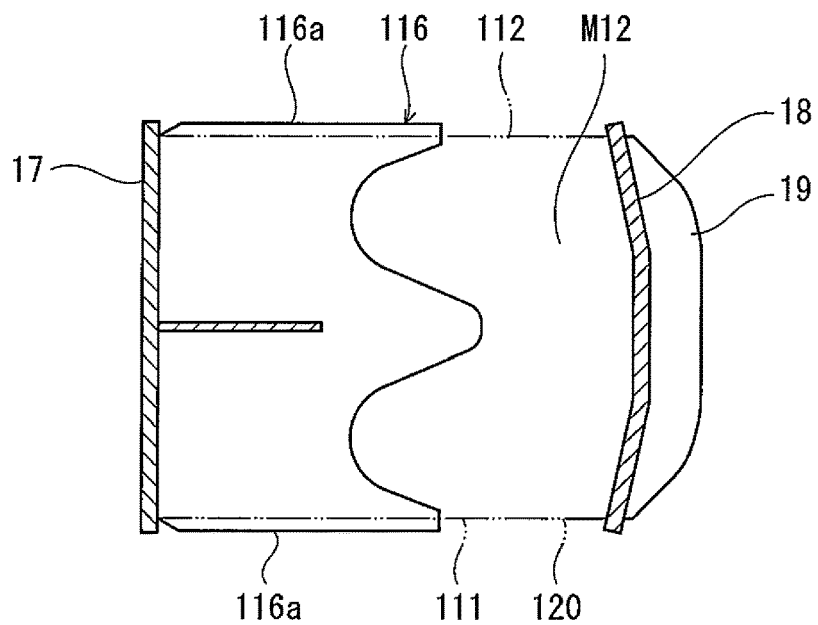
FIG. 6 is a horizontal cross-sectional view of the collision energy absorbing device of FIG. 5 and is a diagram in which an outer tube is shown by virtual lines.

FIG. 5 is a perspective view of a collision energy absorbing device 110 according to Embodiment 2. FIG. 6 is a horizontal cross-sectional view of the collision energy absorbing device 110 of FIG. 5 and is a diagram in which an outer tube 120 is shown by virtual lines. As shown in FIGS. 5 and 6, in the collision energy absorbing device 110 of the present embodiment, slots SL12 formed by outside plates 111 to 114 constituting the outer tube 120 are separated from one of car longitudinal direction end edges of each of the outside plates 111 to 114. Specifically, the left and right slots SL12 are separated rearward from front ends of the outside plates 111 to 114. Therefore, end portions 116a of the horizontal partition plate 116 which portions are inserted into the slots SL12 and sandwiched by the outside plates are separated rearward from the front ends of the outside plates 111 to 114 and the front plate 18. To be specific, the entire horizontal partition plate 116 is separated rearward from the front plate 18, and a missing portion M12 is formed between the horizontal partition plate 116 and the front plate 18. Regarding opposing end edges 111b and 113b of the upper and lower outside plates 111 and 113 and opposing end edges 112b and 114b of the upper and lower outside plates 112 and 114, portions where the slot SL12 is not formed face each other to be joined to each other by welding from outside. According to this configuration, a load peak value at an initial stage of collision can be reduced while satisfactorily maintaining the ease of assembly. It should be noted that as with the slots SL12, the slots SL1 may also be formed so as to be separated from one of the car longitudinal direction end edges of each of the outside plates 111 to 114.

Embodiment 3

Figure 7:
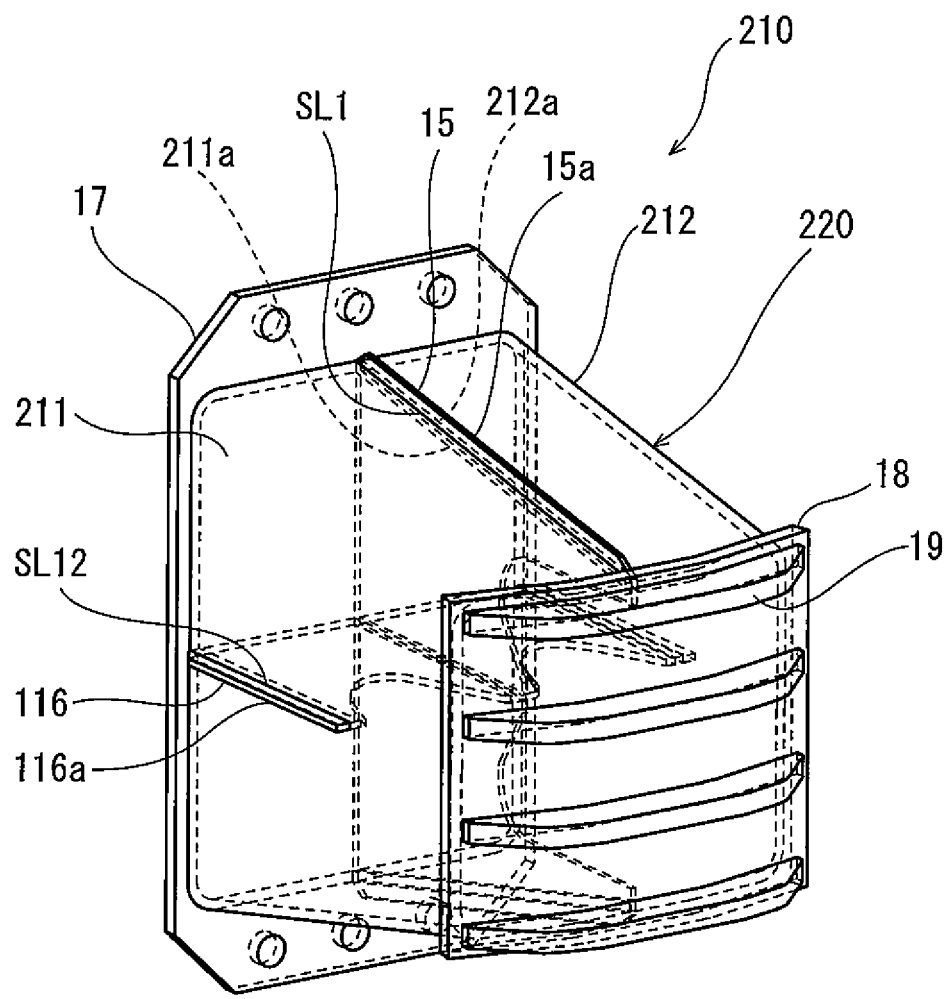
FIG. 7 is a perspective view of the collision energy absorbing device according to Embodiment 3.

FIG. 7 is a perspective view of a collision energy absorbing device 210 according to Embodiment 3. As shown in FIG. 7, the collision energy absorbing device 210 of Embodiment 3 is different from Embodiment 2 in that the left slot SL12 is formed at one outside plate 211, and the right slot SL12 is formed at one outside plate 212. To be specific, the collision energy absorbing device 210 of the present embodiment includes two outside plates 211 and 212 constituting an outer tube 220.

The upper and lower end portions 15a of the vertical partition plate 15 are sandwiched by opposing end edges 211a and 212a of the outside plates 211 and 212 in the leftward/rightward direction. To be specific, the slot SL1 is formed between the end edges 211a and 212a of the outside plates 211 and 212. One of end portions 116a of the horizontal partition plate 116 is inserted into the slot SL12 formed by cutting out the outside plate 211, and the other end portion 116a of the horizontal partition plate 116 is inserted into the slot SL12 formed by cutting out the outside plate 212. According to this configuration, since the number of outside plates 211 and 212 is reduced, the amount of welding can be reduced. It should be noted that only one outside plate may be formed in a tubular shape as a whole in such a manner that as with the slots SL12, the slots SL1 are formed by cutting out the outside plate.

The present invention is not limited to the above embodiments, and modifications, additions, and eliminations of components thereof may be made. The above embodiments may be combined arbitrarily. A part of components or methods in one embodiment may be applied to another embodiment. Further, a part of components in an embodiment may be separated and arbitrarily extracted from the other components in the embodiment. The slot formed by the outside plate may not be open, that is, may be closed at one or both of car longitudinal direction sides of the outside plate and may be a hole. To be specific, the slot may be separated from both car longitudinal direction end edges of the outside plate. Further, the end portions of the partition plate which portions are located at both respective ends in the direction perpendicular to the axis do not have to project outward beyond the outer surfaces of the outside plates. For example, end surfaces of the end portions of the partition plate which portions are located at both respective ends in the direction perpendicular to the axis may be flush with the outer surfaces of the outside plates. Further, the end portions of the partition plate which portions are located at both respective ends in the direction perpendicular to the axis may be arranged inside the outer surfaces of the outside plates. Even in this case, the end portions of the partition plate which portions are located at both respective ends in the direction perpendicular to the axis are only required to be sandwiched by the end edges of the outside plates.

REFERENCE SIGNS LIST 1 railcar
10, 110, 210 collision energy absorbing device
11 to 14, 111 to 114, 211, 212 outside plate
11a to 14a, 11b to 14b, 111a to 114a, 111b to 114b, 211a, 212a end edge
15 vertical partition plate
15a, 16a, 116a end portion
15aa front end region
15e, 16e opposing slit
16, 116 horizontal partition plate
18 front plate
20, 120, 220 outer tube
AX axis
H virtual horizontal surface
M1, M2 missing portion
S internal space
SL1, SL2, SL12 slot
V virtual vertical surface

The invention claimed is:

1. A collision energy absorbing device of a railcar, the collision energy absorbing device comprising:
    at least one outside plate constituting an outer tube having an axis extending in a car longitudinal direction; and
    at least one partition plate extending in the car longitudinal direction in an internal space surrounded by the at least one outside plate, the at least one partition plate being fixed to the outside plate and dividing the internal space, the at least one partition plate including:
        vertical and horizontal partition plates that: (i) intersect each other, (ii) include respective opposing slits fitted to each other, and (iii) are joined to each other by welding with the opposing slits fitted to each other, and
        an end portion located at an end of the at least one partition plate in a direction perpendicular to the axis, the end portion being sandwiched by the at least one outside plate and constituting a part of the outer tube.

2. The collision energy absorbing device according to claim 1, wherein:
    the at least one outside plate comprises a plurality of outside plates; and
    the end portion of the at least one partition plate is sandwiched by opposing end edges of the plurality of outside plates.

3. The collision energy absorbing device according to claim 1, wherein:
    the end portion of the at least one partition plate projects outward beyond an outer surface of the at least one outside plate; and
    the end portion of the at least one partition plate and the outer surface of the at least one outside plate are joined to each other by welding.

4. The collision energy absorbing device according to claim 3, further comprising a front plate facing a front end of the outer tube, wherein:
    a front end of the end portion of the at least one partition plate contacts the front plate from behind;
    a projection amount of a front end region of the end portion of the at least one partition plate from the outer surface of the at least one outside plate decreases as the front end region extends forward; and a front end portion of the outer tube and the front plate are joined to each other by welding from outside.

5. The collision energy absorbing device according to claim 1, wherein:
a slot is formed at a position of the at least one outside plate, the position being separated from a front end of the at least one outside plate in a car longitudinal direction;
the end portion of the at least one partition plate is inserted into the slot; and
the end portion of the at least one partition plate is sandwiched by the at least one outside plate and is separated in a rearward direction from the front end of the at least one outside plate.

6. A collision energy absorbing device of a railcar, the collision energy absorbing device comprising:
at least one outside plate constituting an outer tube having an axis extending in a car longitudinal direction; and
at least one partition plate extending in the car longitudinal direction in an internal space surrounded by the at least one outside plate, the at least one partition plate being fixed to the outside plate and dividing the internal space,
the at least one partition plate including an end portion located at an end of the at least one partition plate in a direction perpendicular to the axis, the end portion being sandwiched by the at least one outside plate, and constituting a part of the outer tube,
wherein:
a slot is formed at a position of the at least one outside plate, the position being separated from one of car longitudinal direction end edges of the at least one outside plate; and
the end portion of the at least one partition plate is inserted into the slot.

7. The collision energy absorbing device according to claim 6, wherein the end portion of the at least one partition plate is sandwiched by the at least one outside plate and is separated in a rearward direction from the front end of the at least one outside plate.

* * * * *